June 2, 1942.   L. O. CARLSEN   2,284,636
METHOD OF AND APPARATUS FOR CUTTING GEARS
Filed March 10, 1937   6 Sheets-Sheet 1

Inventor
Leonard O. Carlsen
By
Attorney

June 2, 1942. L. O. CARLSEN 2,284,636
METHOD OF AND APPARATUS FOR CUTTING GEARS
Filed March 10, 1937 6 Sheets-Sheet 2

Inventor
Leonard O. Carlsen
By
B. Schlesinger
Attorney

June 2, 1942.  L. O. CARLSEN  2,284,636
METHOD OF AND APPARATUS FOR CUTTING GEARS
Filed March 10, 1937  6 Sheets-Sheet 3

Inventor
Leonard O. Carlsen
By
B. Schlesinger
Attorney

June 2, 1942.  L. O. CARLSEN  2,284,636
METHOD OF AND APPARATUS FOR CUTTING GEARS
Filed March 10, 1937  6 Sheets-Sheet 5
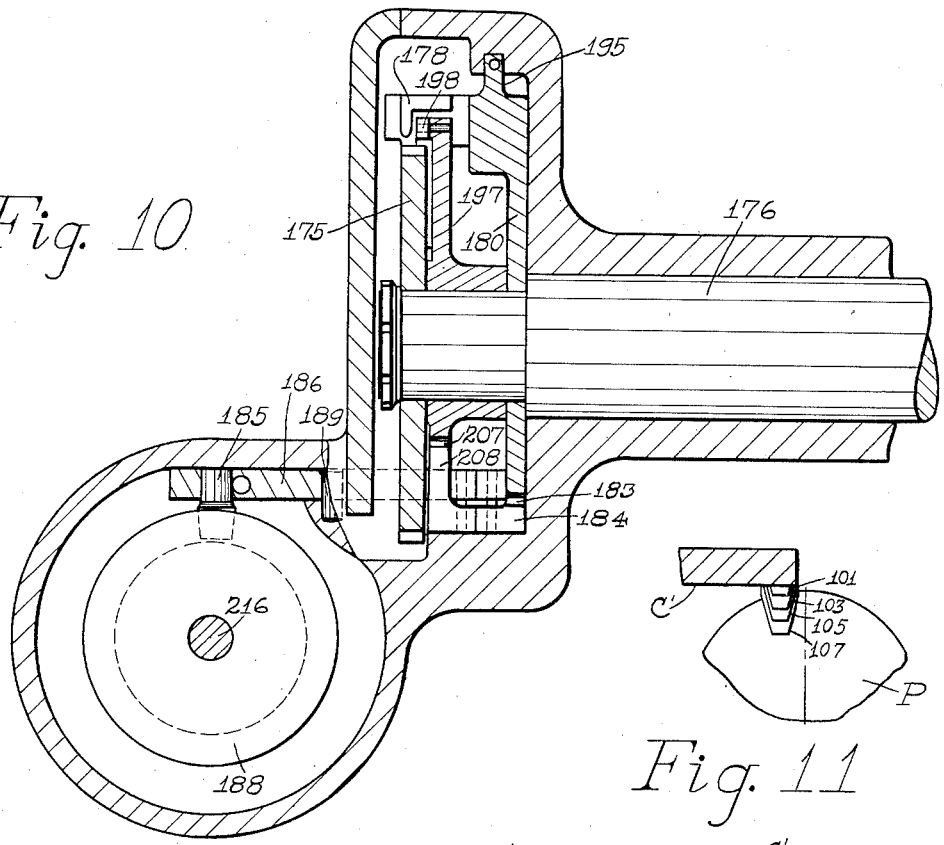
Fig. 10
Fig. 11
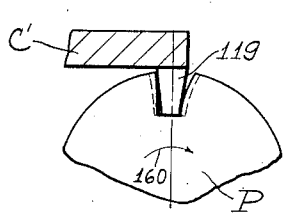
Fig. 12
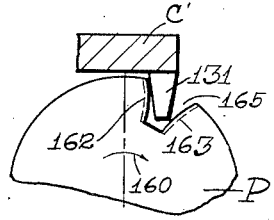
Fig. 13
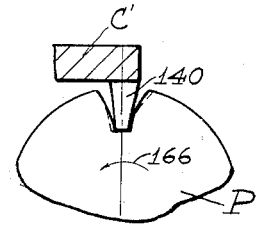
Fig. 14
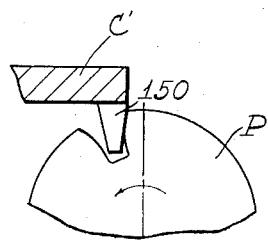
Fig. 15
Leonard O. Carlsen Inventor
By B. E. Schlesinger
Attorney Patented June 2, 1942

2,284,636

UNITED STATES PATENT OFFICE 2,284,636

METHOD OF AND APPARATUS FOR CUTTING GEARS

Leonard O. Carlsen, Rochester, N. Y., assignor to Gleason Works, Rochester, N. Y., a corporation of New York Application March 10, 1937, Serial No. 130,139

13 Claims. (Cl. 90—5)

The present invention relates to the cutting of longitudinally curved tooth gears and particularly to the cutting of gears such as may be employed in automobile differentials, aeroplane drives, and so forth.

A primary object of the invention is to provide a very fast method for cutting both members of a pair of gears of the character described. To this end, it is a further object of the invention to provide a method whereby both members of a pair of gears may be cut with face-mill gear cutters which have blades arranged only part-way around their periphery so that a gear blank may be indexed while the gap in the cutter is abreast of the blank and without requiring any relative separation of the cutter from the blank. To this end, also, it is an object of the invention to provide a method of cutting gears with cutters of the character referred to in which only one member of the pair need be cut in a generating process and the other member may be form-cut, and in which the cutters for cutting the two members of the pair may be so constructed that the cutting operations will be balanced substantially equally between the two gears so that cutters of substantially equal diameters may be efficiently employed in the cutting of the two gears.

A still further object of the invention is to provide a method for successively rough and finish-cutting opposite sides of a tooth space of a gear in a single revolution of a face-mill gear cutter in such way that the finished tooth space will taper in width from end to end.

Still other objects of the invention are to provide a method for generating gears and a face-mill gear cutter capable of practicing such method in which, in a single revolution of the cutter, a tooth space of the gear is completely generated and the tooth space is rough-cut while the gear and tool are rolling relative to one another in one direction and is finish-cut while the gear and tool are rolling relative to one another in the opposite direction.

Still another object of the invention is to provide simple means for angularly adjusting a gear blank about its axis during a single revolution of a cutter of the face-mill type so that opposite sides of a tooth space of the gear may be cut from different centers in a single revolution of the cutter.

A further object of the invention is to provide a simple, rigid and inexpensive machine for generating gears of the type described.

Other objects of the invention will be apparent hereinafter from the specification and from the recital of the appended claims.

In the preferred embodiment of the present invention, the tooth surfaces of the gear are form-cut and only the pinion teeth are generated. The gear is cut with a face-mill gear cutter of large diameter which has its cutting blades arranged only part-way around its periphery so that there will be a gap between the last and first blades to permit of indexing without relative withdrawal of the cutter away from the blank. The preferred form of gear cutter has a group of blades arranged to successively rough-out a tooth slot of the blank and finish-cut one side of the same, followed by a group of blades for successively roughing and finishing the opposite side of the slot. There is a gap between the first and second groups of blades so that when this gap is abreast of the blank in the rotation of the cutter, the blank itself may be rotated slightly on its axis so that when the second group of blades cuts, they will cut relatively from a different center from that at which the first group of blades cuts and this will widen out and taper-cut the tooth space. The blank is indexed after the last blade of the cutter has passed through it and while the indexing gap is abreast of the blank. With the cutter and method of operation described, then, each tooth space of the gear is taper cut completely from the solid in a single revolution of the cutter.

The pinion is also cut with a face-mill gear cutter of large diameter having its cutting blades arranged only part-way around its periphery with a gap between the last and first blades to permit of indexing the blank without relative withdrawal of the cutter away from the blank. The pinion cutter, however, has its cutting blades preferably arranged so as to cut opposite sides of each tooth space of the blank from the same center. The first blades of the pinion cutter are roughing blades and rough-out a tooth space of the pinion blank during relative roll of the cutter and blank in one direction, and the remaining blades of this cutter are finishing blades and finish the tooth space during relative roll of the cutter and blank in the opposite direction. The blank is indexed at the end of this return roll when the gap in the cutter is abreast of the blank and both sides of a tooth space of the blank are, therefore, roughed and finished in a single revolution of the cutter and in a single generating cycle.

In gearing of the character adapted to be produced by the method of the present invention, it is usually desirable to have the gears mesh with a localized tooth bearing or contact. To obtain such a localized tooth bearing, the pinion in the preferred method of the present invention, is not generated conjugate to its mate gear, but to a tapered basic gear which is different from its mate and whose axis is inclined to the axis of the pinion blank at an angle slightly smaller than the angle between the axis of the pinion and the axis of its mate gear when the pair are in mesh. The angle between the axis of this basic generating gear and the axis of the pinion blank may be made constant for all jobs within the range of a given gear cutting machine. Hence the inclination of the axis of the work spindle to the axis of the cradle may be fixed on a given machine. This makes for simple, rigid and inexpensive construction.

In the drawings:

Figs. 9 and 10 are sectional views taken at right angles to one another showing how the index mechanism of a standard gear cutting machine may be modified to permit cutting gears upon that machine according to the preferred method of the present invention;

Figures 7, 8:
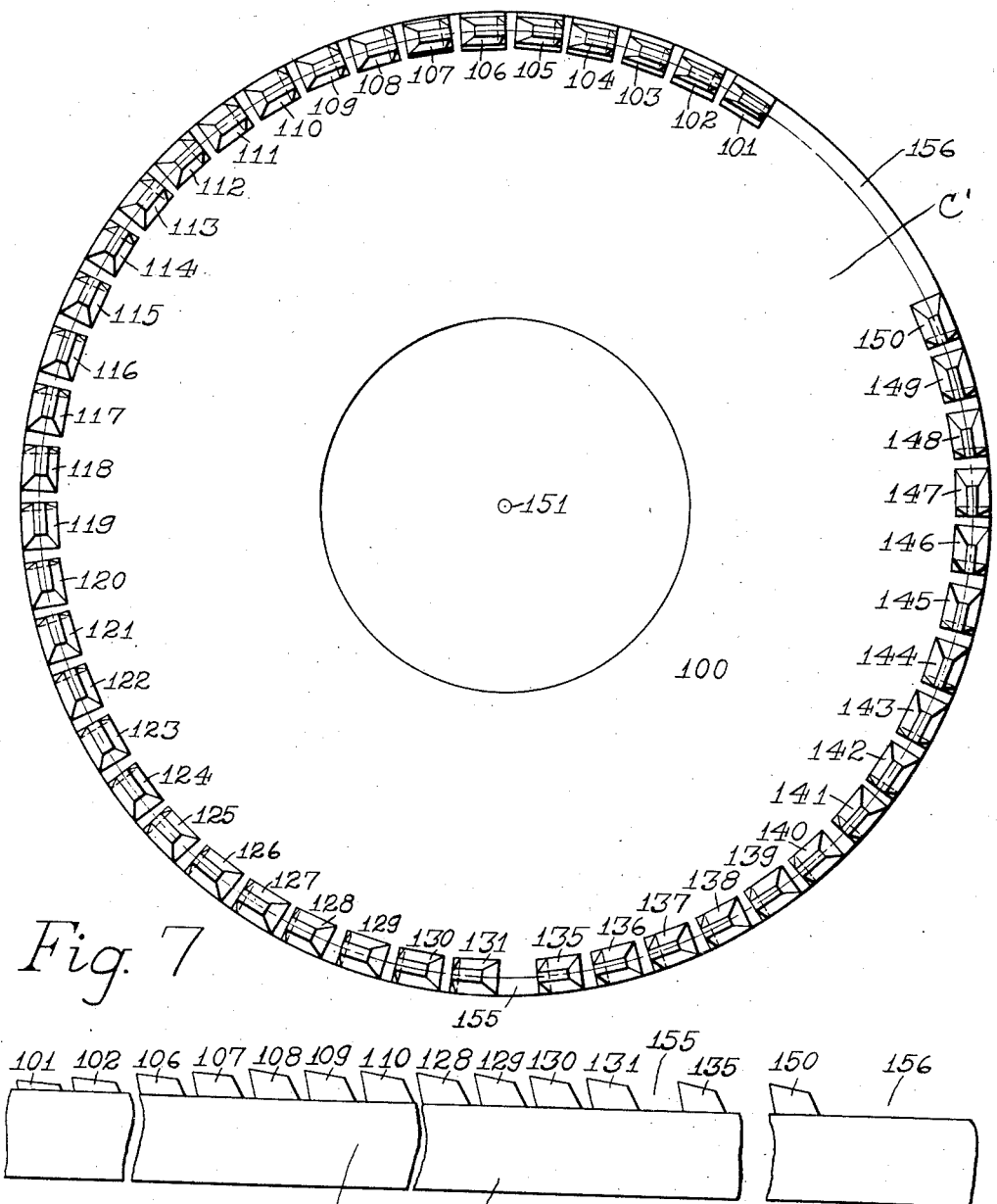
Fig. 7 is a plan view of a preferred form of cutter for cutting the pinion or smaller member of the pair according to this invention.
Fig. 8 is a fragmentary developed view of the cutter shown in Fig. 7.
Figure 16:
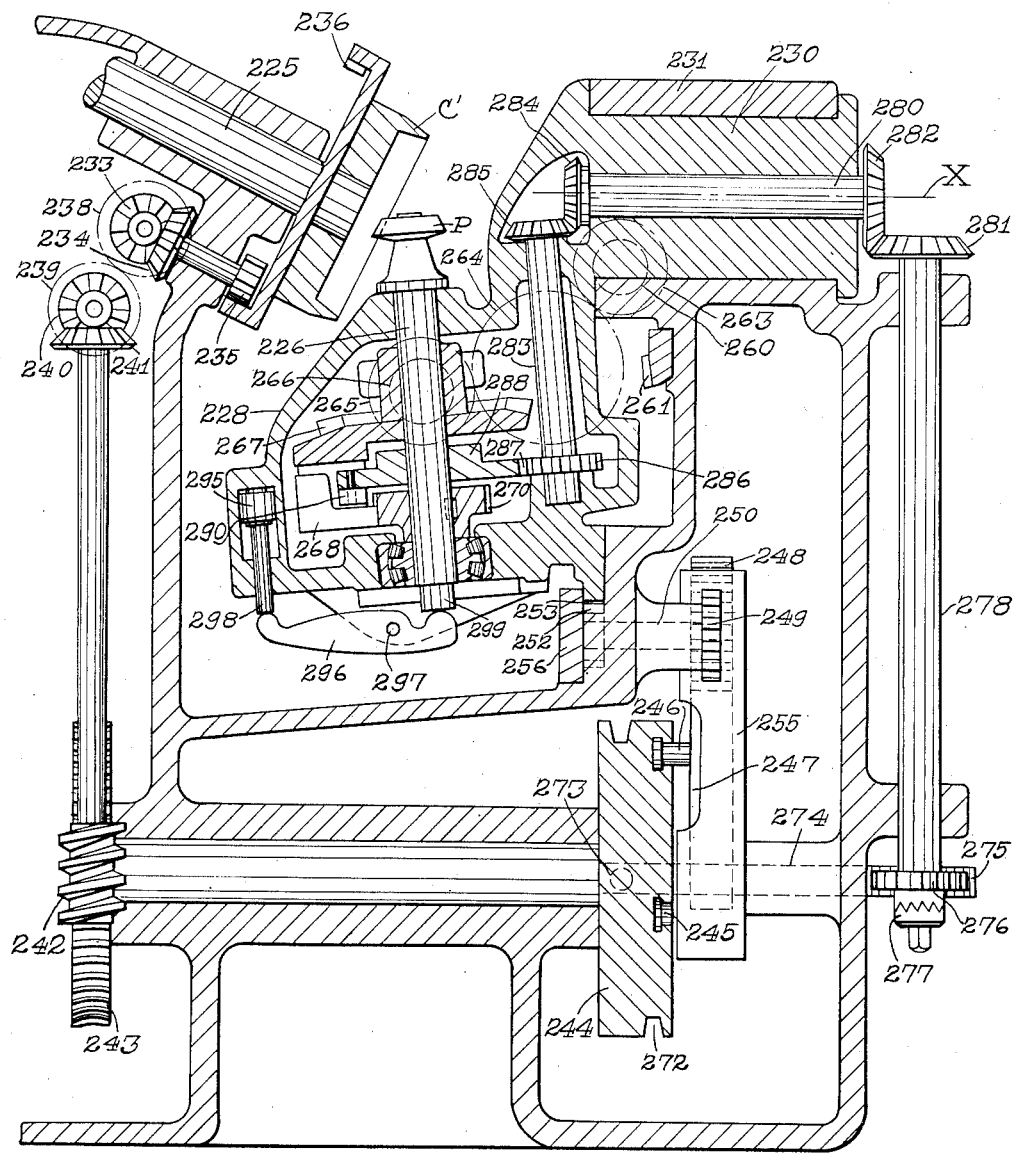

Figs. 11 to 15 inclusive are diagrammatic views illustrating successive steps in the cutting of a tooth space of a pinion with the cutter shown in Fig. 7; and Fig. 16 is a sectional view, illustrating somewhat diagrammatically one embodiment of a machine for generating pinions according to the method of the present invention.

Figure 5:
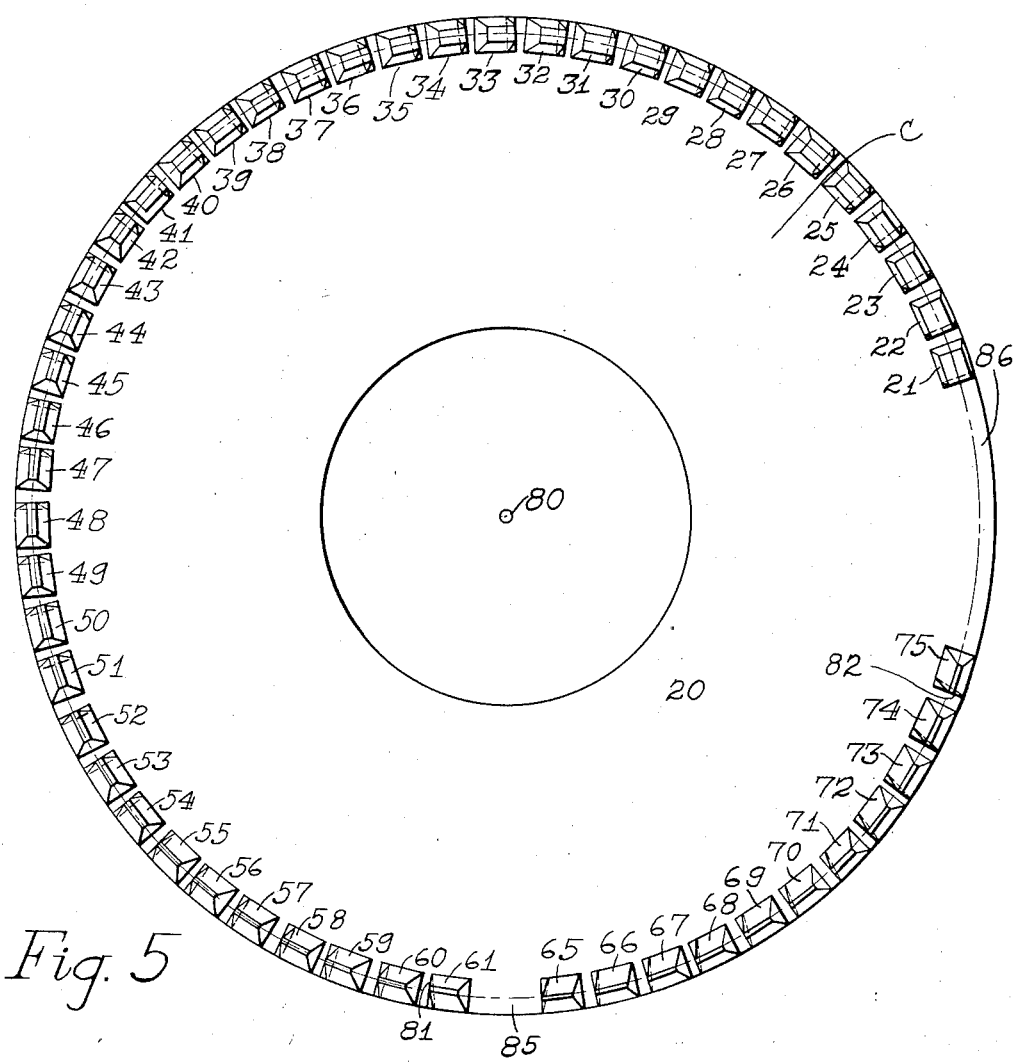
Fig. 5 is a plan view of a preferred form of cutter for cutting the gear or larger member of a pair of gears according to this invention.
Figure 6:
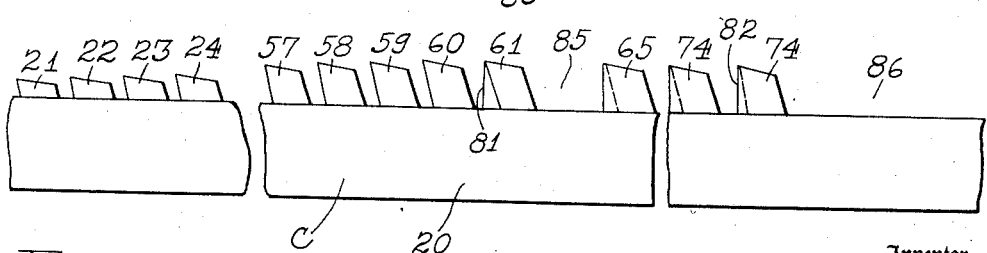
Fig. 6 is a fragmentary developed view of the cutter shown in Fig. 5.

In cutting the gear or larger member of a pair of gears according to the present invention, a cutter of the type shown in Figs. 5 and 6 is preferably employed. This cutter is of the face-mill type and comprises a rotary head 20 and a plurality of cutting blades which extend only partway around the periphery of the head and which have their cutting portions projecting beyond one side face of the head in the general direction of the axis of the head as is usual in face-mill gear cutters.

The blades are preferably arranged in two groups. The blades of the first group are denoted at 21 to 61 inclusive, while the blades of the second group are denoted at 65 to 75 inclusive. The blades may be integral with the head, or in the form of segments which are secured to the head or they may be inserted blades.

In the cutter shown, the blades 21 to 60 inclusive are roughing blades and the blade 61 is a final finishing blade for one side of the tooth slot being cut. The blades 21 to 60 inclusive are of gradually increasing height so that as the cutter rotates in engagement with a gear blank, each of these blades will cut successively deeper into a tooth space of the blank to the full depth of the tooth space as a limit. The blades 21 to 60 inclusive are preferably sharpened with a front hook, as shown, so that each blade cuts on both sides. The blades, however, might be sharpened so that alternate blades cut on opposite sides of a tooth space or the blades might also be arranged so that alternate blades are bottom cutting blades and intermediate blades are side cutting blades. Both arrangements are well known in the art and still other arrangements are possible.

The finish-cutting blade 61 has its front face sharpened with a side rake so that it has a finish-cutting edge at one side of the blade, in this case at the inside of the blade. In the cutter shown, the roughing blades 21 to 60 have their corresponding side cutting edges all at the same radial distance from the axis 80 of the cutter. The finish-cutting blade 61, however, will have its inside cutting edge 81 at a smaller radial distance from the axis of the cutter than the inside cutting edges of the blades 21 to 60 inclusive. This is so that this final finish-cutting edge may take a clean finishing cut on the concave side of a tooth space of a gear blank. The arrangement corresponds to that employed in other "Single Cycle" type cutters, of which the present cutter is one modification.

The blades 65 to 74 inclusive are roughing blades for taper cutting the opposite side of the tooth slot from that finished by the blade 61 and the final blade 75 is for finish-cutting this opposite side of the tooth slot.

The blades 65 to 75 inclusive are all outside cutting blades and have their front faces sharpened with side rake, as shown, to provide the outside cutting edges. These blades are preferably made all of the same height, but with the outside cutting edges of successive cutting blades lying at successively increasing distances from the axis 80 of the cutter so that as each successive blade passes through a tooth slot of a gear blank, it will remove stock from one side of this tooth space to the full height of the tooth space and then the final blade 75 will take a finishing cut on this side of the tooth space. It will be understood, however, that the blades 65 to 74 inclusive might be made of gradually increasing height with their outside cutting edges all disposed at the same radial distance from the axis 80 of the cutter in a manner similar to the roughing blades of the first group. In this case, however, the outside cutting edge 82 of the final finishing blade 75 would still be disposed at a greater radial distance from the axis 80 of the cutter than the outside cutting edges of the blades 65 to 74 inclusive so that this blade 75 would take the finishing cut.

It will be understood, also, that the roughing blades of the first group of blades might be made so that their corresponding cutting edges are disposed at gradually increasing distances, for the outside cutting edges, and at gradually decreasing distances, for the inside cutting edges, from the axis of the cutter in a manner similar to the arrangement and construction employed in other "Single-Cycle" type face mill gear cutters and in a manner similar to the arrangement of the outside cutting blades 65 to 74 of the second group. Other variations in arrangement and form of the blades may be made, as will be obvious to those skilled in the art. The ratio of roughing to finishing blades may also be varied so that, for instance, instead of having a single finishing blade in each group, two or more finishing blades may be provided. These finishing blades will have corresponding side cutting edges disposed at the same radial distance from the axis of the cutter and the plural number of finish-cutting blades will simply be provided to insure more accurate cutting so that if there is any spring of one finishing blade away from the cut, the other finishing blade or blades will produce the correct finished surface.

There is a gap 85 between the last blade 61 of the first group of blades and the first blade 65 of the second group. The gap is of sufficient angular extent to permit setting over of the blank for the taper cut between operation of the two groups of blades without withdrawing the cutter relatively away from the blank. There is a gap 86 between the last blade 75 of the second group and the first blade 21 of the first group. This gap is of sufficient angular extent to permit of indexing the gear blank, without relative withdrawal between cutter and blank, when this gap in the cutter is abreast of the blank in the rotation of the cutter.

Figure 1:
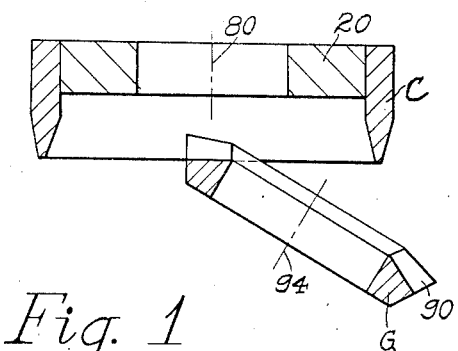
Fig. 1 is a sectional view, illustrating diagrammatically the preferred method of cutting a gear according to this invention.
Figure 2:
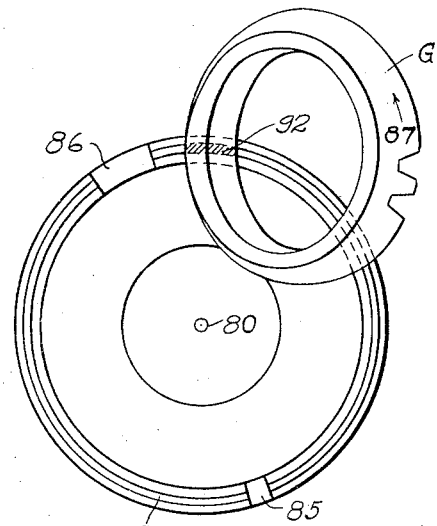
Figs. 2 and 3 are plan views illustrating diagrammatically successive positions of tool and blank in the cutting of the gear.
Figure 3:
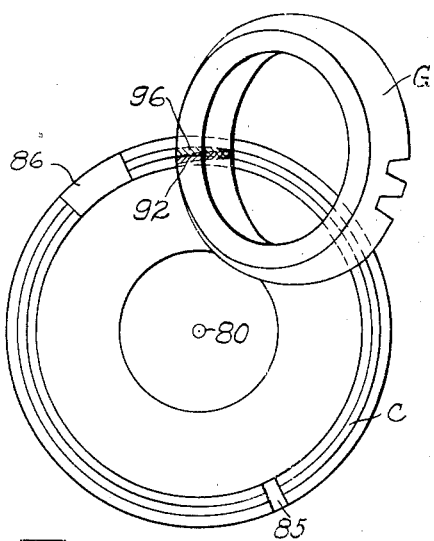

The operation of the cutter in the cutting of a gear may now be explained by reference to Figs. 1 to 3 inclusive. The gear cutter, designated as a whole at C is adjusted into engagement with the gear blank G to be cut so that the cutting blades of the cutter will cut the tooth spaces 90 of the gear blank to their full depth without a relative feed movement between the cutter and the blank. The cutter is rotated on its axis 80 and the gear blank is held stationary while the blades 21 to 61 inclusive are cutting. These blades will cut ever deeper and deeper into the blank until they cut to full depth of the tooth space of the blank and the final blade 61 will finish-cut one side of this tooth space. The slot cut by these blades will be of uniform width throughout its length and is denoted by the shaded portion 92 in Fig. 2. The convex side of this slot will be finish-cut by the finishing blade 61.

When the gap 85 in the cutter arrives abreast of the blank in the rotation of the cutter, the blank will be rotated slightly on its axis 94 in the direction of the arrow 87. The blank will be held stationary again, however, while the blades 65 to 75 inclusive are taking their cuts in the continued rotation of the cutter. Because of the angular rotation of the blank, however, between operation of the two groups of blades, the cutter will be cutting relative to the gear blank from a different center, while the blades 65 to 75 are in operation, from that from which it cuts when the blades 21 to 61 inclusive are in operation. The result will be that the blades 65 to 75 inclusive will successively rough and finish-cut an additional portion of the tooth slot such as denoted by the shaded portion 96 in Fig. 3. The angular rotation of the blank between operation of the two groups of blades will be such that this part 96 of the tooth slot will overlap the part 92 cut by the blades 21 to 61 inclusive at the small end of the tooth slot and due to the eccentric relation of the cutter in its two positions of cutting, a tooth space will finally be produced which tapers in width from end to end as desired.

When the gap 86 in the cutter is abreast of the blank, the blank will be indexed to bring a new portion of the blank into position to be cut in the next revolution of the cutter. When the first cutting blade 21 is rotated into operating position again, then, it will operate upon a new part of the blank to begin cutting a new tooth space therein. It will be seen, then, that a tooth slot of the gear blank will be rough and finish-cut to tapered lengthwise shape in a single revolution of the cutter and without any relative feed or withdrawal movement between the cutter and the work. When the cutter has made as many revolutions as there are tooth slots to be cut in the blank, the blank will be finished.

The blades of the cutter shown in the drawings have side cutting edges of straight profile and the tooth cut will, therefore, be of straight sided profile. It will be understood, however, that if desired, the blades might be made of curved profile and produce a gear having form curved tooth profiles.

One form of tool for cutting the pinion, which is to mate with the gear G, is shown in Figs. 7 and 8. This cutter comprises a rotary head 100 and a plurality of cutting blades which are arranged circularly part-way only around the periphery of the head.

The blades of this cutter are arranged in two groups. The first group of blades comprises those denoted at 101 to 131 inclusive. These blades are roughing blades. The second group of blades are denoted at 135 to 150 inclusive and are finishing blades. The first few roughing blades are intended to cut while the pinion blank is held stationary. These are the blades 101 to 107 inclusive. In the embodiment of the invention shown in the drawings, these blades are of successively increasing width and height to the full height of the tooth space as a limit so that they gradually cut a wider and deeper slot in the blank as they take their successive cuts during the rotation of the cutter. The blades 108 to 131 inclusive are all of the same point-width and height, but they are of narrower point-width than the blades 135 to 150 inclusive. In other words, the inside cutting edges of the blades 135 to 150 inclusive are disposed closer to the axis 151 of the cutter than are the inside cutting edges of the blades 108 to 131 inclusive and likewise the outside cutting edges of the blades 135 to 150 inclusive are disposed at a greater radial distance from the axis 151 of the cutter than the outside cutting edges of the blades 108 to 131 inclusive. This is so that the finish-cutting blades may take the finishing cuts on the sides of a tooth space of the pinion blank as the cutter rotates in engagement with the blank.

All of the blades of the cutter shown in Figs. 7 and 8 are sharpened with a front hook so that each blade will have two opposite side cutting edges. Alternate blades might, however, be sharpened so as to cut alternately on opposite sides of a tooth space of the blank. Again, instead of having the entering roughing blades 101 to 107 inclusive vary both in point-width and height, they might be made like the blades 21 to 60 inclusive of the cutter shown in Fig. 5, namely, of successively increasing height, but with their corresponding edges all disposed at the same radial distance from the axis of the cutter. Other modifications of the cutter will be apparent to those skilled in the art.

There is a slight peripheral gap in the cutter between the blade 131 and the blade 135. This gap is provided and is of sufficient angular extent to permit reversal of the direction of relative roll of the cutter and the pinion blank during cutting without danger that backlash in the train of gearing which drives the rolling parts might effect the accuracy of the cut. This gap permits of the backlash being taken up after reversal before the blade 135 begins to cut. This gap also allows the roller or follower, if a cam is used to produce the generating motion, to get around the end of the cam-track before the finishing cut on the return roll begins.

There is a larger peripheral gap in the cutter between the blades 150 and 101. This peripheral gap is of sufficient angular extent to permit of indexing the blank while the gap is abreast of the blank in the rotation of the cutter and without requiring relative separation of the cutter and the blank.

The method of cutting a pinion blank with a cutter such as shown in Figs. 7 and 8 is illustrated diagrammatically in Figs. 11 to 15 inclusive. The cutter is adjusted initially relative to the pinion blank so that the cutting blades of the cutter will cut to the full desired depth of the tooth spaces of the gear blank without any relative depthwise feed movement between the cutter and blank. The cutter is further adjusted relative to the blank so that the first blades of the cutter cut at a point corresponding to the starting point for the generating roll, that is, at a point at one end of the roll, as shown in Fig. 11. During action of the blades 101 to 107 inclusive, the blank is stationary, as already mentioned and these blades cut gradually wider and deeper into the blank. The cuts taken by these several blades are indicated diagrammatically in Fig. 11. Only four of the blades have been indicated in this figure for the sake of clearness of illustration.

When the blade 107 has completed its cut, a slot will have been produced in the gear blank which is of the desired depth. The generating roll between the tool and blank will then be begun. Figs. 12 and 13 illustrate, respectively, points at the center and at the end of the roll in the direction of the arrow 160. During this roll, the roughing blades 108 to 131 inclusive will cut while the blank rolls relative to the cutter, and at the end of the roll in this direction, the tooth slot will have side surfaces that are of generated profile shape but which are spaced, as shown, from the finished side surfaces 162 and 163, respectively, of the tooth slot 165 by the amount of stock to be removed in the finish-cutting operation.

When the last roughing blade 131 has taken its cut, the direction of roll is reversed and during reversal, the gap 155 in the cutter is abreast of the blank. This gap is of sufficient angular extent to permit of the backlash in the generating train to be taken up so that when the first finishing blade takes its cut, it will cut in correct relation to the blank and not mutilate or destroy the tooth surfaces which are to be finish-cut. The generating roll now proceeds in the direction 166 and the blades 135 to 150 take their cuts. Figs. 14 and 15 illustrate, respectively, points at the center and end of the return finishing roll.

When the last blade 150 has taken its cut, a tooth space of the blank will have been roughed and finished. It will have side tooth surfaces, which are generated and are curved longitudinally about the same center, lying on the axis 151 of the cutter. The gap 156 of the cutter will now be abreast of the blank and while the cutter is rotating with this gap abreast of the blank, the blank will be indexed to bring a new part of the blank into operative engagement with the tool.

This indexing does not require any relative separation of the cutter from the blank because of the gap 156 between the cutting blades. On each revolution of the cutter C', then, a tooth space of the pinion will be completely generated, and, when the cutter C' has made as many revolutions as there are tooth spaces in the pinion to be cut, the pinion will be completed.

The number of finishing blades 135 to 150 in the cutter will be determined by the number of cuts required on the tooth profiles of the gear in order to produce the desired tooth surface finish. In the cutter shown, the blades of the cutter C' have straight side-cutting edges. Other profile shapes may be employed, however, as is the case with any face-mill cutter for cutting gears in a generating operation.

The generating roll between the pinion blank P and the pinion cutter, denoted as a whole at C', may be effected in any way suitable to generate tooth surfaces on the pinion conjugate to those of the mate gear G. In this generating roll, for instance, the cutter might be adjusted to represent the mate gear and the generating roll might comprise rolling movement between the cutter and blank as though the pinion blank were rolling upon the mate gear. It is generally preferable, however, to produce tooth surfaces upon the pinion which will mesh with the teeth of the mating gear with a localized tooth bearing. This localization of tooth bearing may also be produced in various ways. It is preferred, however, to employ the method described in the pending application of Ernest Wildhaber, Serial No. 137,532, filed April 17, 1937, for this purpose. In this method, the cutter will be positioned to represent a gear which differs from the mate gear and whose axis is inclined to the axis of the pinion at an angle different from the angle between the axes of the pinion and its mate when the pair are in mesh.

Figure 4:
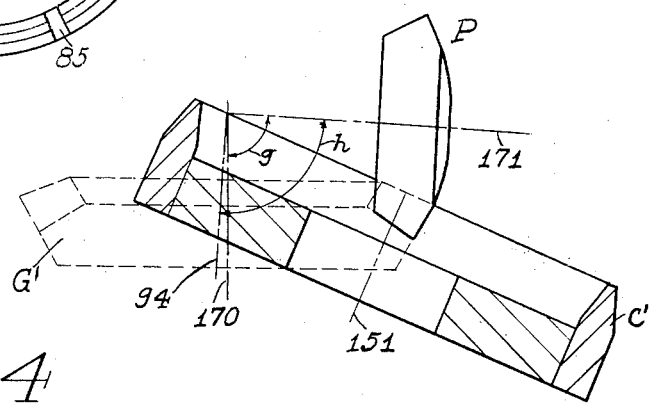
Fig. 4 is a sectional view illustrating diagrammatically the preferred method of cutting the mating pinion.

This method of cutting is illustrated diagrammatically in Fig. 4. The cutter C' is here positioned to represent a tapered gear G' whose axis 170 is inclined to the axis 171 of the pinion blank C at an angle $g$ which is less than the angle $h$ between the axis 171 of the pinion and the axis 94 of the gear when the pair are in mesh. The angle $h$ in the example shown is a right angle and the angle $g$ will usually differ from a right angle by an amount slightly less than the dedendum angle of the gears.

Figure 9:
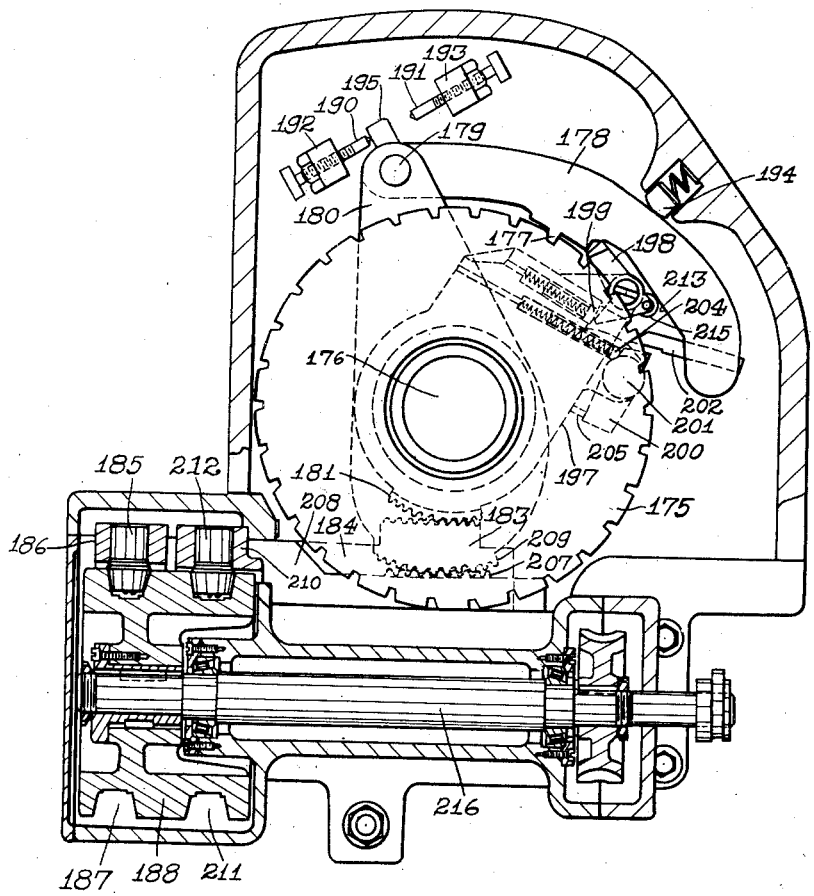

For cutting the gear or formed member of the pair according to the process described, a machine is required in which the work is held stationary during cutting and the operation of the index mechanism is timed to the cutter rotation. The machine illustrated in the U. S. patent to Schauseil et al., No. 2,044,485 of June 16, 1936, may be used for the purpose when modification is made to effect the relative set-over of the blank required to produce the tapered tooth slot. This set-over can be effected very readily on the machine of this patent, however, by a slight modification of the index mechanism of the machine, a modification which is illustrated in Figs. 9 and 10 of the drawings of the present application.

The index mechanism of the machine is of the notched-plate type. It includes a notched index plate 175 which is keyed or otherwise secured to the work spindle 176 of the machine. The work spindle is locked against rotation, during cutting, by a locking-dog 177 that is carried by a lever 178.

In the modified form of machine, this lever is pivotally mounted upon an arm 180. This arm carries a spur gear segment 181 which meshes with a rack 183 that is carried by a bar 184. The bar 184 is pivotally connected to a lever 186. This lever is pivoted at 189 in the work head of the machine and carries a roller 185 that engages in the track way 187 of a cam 188, so that as the cam rotates, the bar 184 is reciprocated to rotate the arm 180 in one direction or the other. Hence, when the lever 178 is in locking position, the work spindle of the machine may be rotated. The lever 178 is constantly urged to locking position by the spring-pressed plunger 194. Stops 190 and 191 that thread into lugs 192 and 193, respectively, are provided to limit the angular movement of the arm 180. These stops are adapted to engage a lug 195 formed either upon the arm 180 or upon the lever 178.

The rest of the index mechanism of the machine is more or less standard in construction. There is an arm 197 rotatably mounted upon the work spindle and this arm carries a pivotally mounted pawl 198 that is adapted to engage a notch of the index plate 175 when the locking dog 177 is disengaged therefrom. The pawl 198 is constantly urged to operative position by a spring-pressed plunger 199 which is mounted in the arm 197 and which engages the tail of the pawl 198.

The locking-dog 177 is disengaged by operation of a trip-dog 200 which is pivotally mounted at 201 upon the arm 197. This trip-dog is adapted to engage a pin 202 which is carried by the lever 178. The trip-dog is resiliently urged in a clockwise direction by a spring-pressed plunger 204 which is mounted in the arm 197. The clockwise movement of the trip-dog is limited, however, by a stop pin 205 which is mounted upon the arm 197.

The arm 197 is rotated by means of a rack 207, which is carried by a bar 208 and which engages a spur gear segment 209 that is secured to the arm. The bar 208 is pivotally connected to a lever 210 which is pivoted intermediate its ends and carries a roller 212 which engages in a groove 211 of the cam 188 so that as the cam rotates, the bar is reciprocated to move the arm 197 first in one direction and then in the other.

In the counter-clockwise movement of the arm 197, the trip-dog 200 engages the pin 202 and rocks the lever 178 about its pivot 179, disengaging the locking dog 177 from the index plate 175. As the lever arm 178 is rocked away from operative position, the cam surface 213 of this arm is withdrawn from engagement with the roller 215 of the pawl 198 and the pawl drops into engagement with the plate 175 under actuation of the spring-pressed plunger 199. In the further rotation of the arm 197, then, the work spindle is rotated by the pawl 198 and indexed. As soon as the trip-dog 200 has passed under the pin 202, the locking-dog 177 drops back onto the periphery of the index plate and when it registers with the next notch of that plate, it locks the plate up again and the pawl 198 is withdrawn from engagement with the plate by return of the cam surface 213 of the lever 178 into engagement with the roller 215. The indexing operation is thus completed.

On the return rotation of the arm 197 in the clockwise direction, the trip-dog 200 passes idly under the pin 202, being rocked about its pivot 201 in a counter-clockwise direction against the resistance of the plunger 204.

The cam 188 may be substituted for the cam 170 shown in the Schauseil et al. patent and be driven, as in the finishing machine described in that patent, in time with the rotation of the cutter by the shaft 216 upon which it is mounted. The work spindle of the gear machine is locked by the lever 178 to the arm 180 during cutting. The cam groove 187 will be so formed that the gear blank G is held stationary while the blades 21 to 61 are taking their cuts, but when the gap 85 in the cutter C is abreast of the gear blank which is being cut, the bar 184 will be actuated to rotate the arm 180 from the position shown in Fig. 9 to its limit position determined by the pin 191. This will effect the desired angular set-over of the blank so that as the blades 65 to 75 inclusive of the gear cutter C pass through the blank, they will taper cut the previously slotted-out tooth space, as already described.

When the gap 86 in the cutter is abreast of the blank in the further rotation of the cutter, the work spindle will be indexed, as above described and at the same time, the bar 184 will be moved by the cam groove 187 in the reverse direction from its previous movement to reset the work spindle. The resetting of the index mechanism may take place while the cutter is actually cutting a new tooth slot in the blank.

The stops 190 and 191 do not control the angle of movement of the arm 180. This is controlled by the path 187 of the cam 188. The stops are adjusted close enough together, however, to take up all back-lash in the train of gearing which operates the arm at both ends of movement of the arm.

For generating the pinion, a machine is required in which the rotation of the cutter is timed to the generating roll and to operation of the index mechanism. In Fig. 16, I have illustrated somewhat diagrammatically a preferred form of machine for this purpose.

The cutter C' is secured in any suitable manner to the cutter spindle 225 which is suitably journaled in the frame of the machine. The pinion blank P to be cut is secured in any suitable manner to the work spindle 226 which is suitably journaled in the cradle 228. The cradle is formed with a trunnion 230 that is journaled in a circular bearing 231 formed on the frame of the machine.

The cutter C' is driven from a motor or other suitable source of power (not shown) through the bevel gearing 233—234, the spur pinion 235 and the internal gear 236. The cradle is oscillated in time with the cutter rotation through the spur gears 238 and 239, the bevel gears 240 and 241, the worm 242, the worm wheel 243 and the cam 244. This cam is formed in one face with a cam groove 245. A roller 246 carried by a bar 247 engages in the cam groove 245. There is a rack 248 integral with the bar 247 and this rack meshes with a spur pinion 249 which is secured to a shaft 250. At its opposite end, the shaft 250 carries a spur pinion 252 which meshes with a spur gear segment 253 formed on the periphery of the cradle 228. Thus, as the cutter rotates on its axis, a reciprocating movement is imparted to the bar 247 and through the gearing described, an oscillating motion is imparted to the cradle in time with the cutter rotation.

The bar 247 reciprocates in a guide 255 which is suitably secured to the frame of the machine. The cradle 228 is held in position by an arcuate gib 256 which is secured to the frame of the machine.

As the cradle rotates on its axis, which is denoted at X, the work spindle is rotated on its axis to produce the generating roll; this generating rotation of the work spindle is effected by mesh of a hypoid pinion 260 with a hypoid gear segment 261. The hypoid segment 261 is secured to the frame of the machine in any suitable manner and is coaxial with the axis X of the cradle. The hypoid pinion 260 is journaled in any suitable manner on the cradle. Hence, as the cradle rotates on its axis, the hypoid pinion 260 will revolve about the axis of the cradle in mesh with the hypoid segment 261. The hypoid pinion drives the work spindle 226 through the spur gears 263, 264 and 265, the bevel pinion 266, and the bevel gear 267.

The bevel gear 267 is connected to a lever arm 268, which is similar to the lever arm 178 and carries a locking-dog which is adapted to engage the notched index plate 270. This notched index plate is keyed to the work spindle 226. Hence, as long as the locking dog is in engagement with the notched plate 270, motion is transmitted from the bevel gear 267 to the work spindle 226 to rotate the work spindle in time with the rotation of the cradle 228 to effect the generating motion.

Indexing of the work spindle is effected from the cam 244. This cam is provided with a peripheral cam groove 272. A roller 273 carried by a bar 274 engages in this cam groove. This bar reciprocates in suitable guides formed on the frame of the machine and carries a rack 275 which meshes with a spur pinion 276. The spur pinion is connected by means of the clutch 277 with a shaft 278. This shaft drives the shaft 280 through the bevel gears 281 and 282. The shaft 280 is journaled in the trunnion 230 of the cradle coaxially of the cradle. This shaft drives a shaft 283 through the bevel gearing 284 and 285. The shaft 283 carries a spur pinion 286 which meshes with a segment 287 that is integral with the arm 288. This arm is rotatably mounted upon the work spindle 226. It is similar in construction to the arm 197 (Fig. 9) and carries a trip-dog (not shown) which is similar to the trip-dog 200 and is adapted, during rotation of the arm, to engage and move the lock lever 268 from operative position. The arm 288 also carries a pawl 290 which is adapted, when the locking lever is withdrawn from operative position, to engage in a notch of the index plate 270 to connect the arm 288 to the index plate and to the work spindle and drive the work spindle to effect indexing of the same.

The clutch 277 is provided to permit rotative adjustment of the work spindle independently of the cradle or of the cutter.

In the machine illustrated, the axis of the work spindle 226 is inclined to the axis X of the cradle at an angle which is slightly less than a right angle. This machine is adapted, therefore, to generate pinions of right angular bevel gear pairs according to the method illustrated in Fig. 4.

The machine is illustrated quite diagrammatically in Fig. 16 and it will be understood, of course, that the necessary adjustments for spiral angle, pitch-cone angle of the basic gear to which the pinion is to be generated conjugate, cone-distance of the work, etc. will be provided, as is usual in machines for generating pinions.

In the operation of the machine shown in Fig. 16 with a cutter such as shown in Figs. 7 and 8, the cutter will be rotated continuously on its axis during the cutting of a given pinion blank. In the cutting of each tooth space of the pinion blank, the pinion will be held stationary while the roughing teeth 101 to 107 inclusive of the cutter are taking their cuts. For this purpose, the cam groove 245 of the cam 244 may be provided with a dwell of suitable length. When the cutter has rotated far enough for the blade 108 to begin its cut, the generating roll will begin and the roll will continue in one direction while the blades 108 to 131 inclusive are taking their cuts. Then the direction of roll will be reversed by reversal of the direction of movement of the rack 248 through suitable formation of the cam groove 245. During reversal, the gap 155 in the cutter will be abreast of the blank and hence any backlash in either the gear train 248—249—252—253 or in the gear train 261—260—263—264—265—266—267 will not affect the cut. The blades 135 to 150 inclusive cut during the return roll of the cradle and finish the tooth slot. When the gap 156 of the cutter is abreast of the blank, the blank is indexed by the index mechanism described.

The described cutting and generating cycles are repeated for each tooth space in the pinion to be cut and when the cutter has made as many revolutions or the cradle has made as many oscillations as there are tooth spaces in the pinion to be cut, the generation of the pinion will have been completed.

It is preferred to use an indexing mechanism such as illustrated in the drawings, which is positively actuated rather than one which is actuated from the generating roll, although such might be used instead, because the positively operated index mechanism can be operated faster.

Any suitable mechanism may be employed for chucking the work. In Fig. 16 a hydraulic chuck release has been illustrated. This comprises the piston 295 and the lever 296. This lever is pivotally mounted at 297 and engages at one end with the piston rod 298 and at its other end with the draw-bar 299 of the chucking mechanism. This is a type of chucking mechanism in common use and need not further be described here.

While the invention has been described in connection with the production of a particular form of gearing, it will be understood that it is applicable to manufacture of other types of gears also. It will be further understood that while several embodiments of the invention have been shown and described, that the invention is capable of further modification and this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting a gear which comprises employing a face-mill gear cutter which has two groups of blades arranged, one following the other, part-way around its periphery to cut, respectively, opposite tooth sides of a gear and which has a gap between the last and first blades, rotating said cutter in engagement with a gear blank, effecting relative movement between the cutter and blank between operations of the two groups of blades so that the cutter will cut relatively from different centers during operation of the two groups of blades and indexing the blank when the gap in the cutter is abreast of the blank.

2. A face-mill gear cutter having a plurality of cutting blades arranged in two groups part-way around its periphery, the blades of the first group having opposite side cutting edges, and the blades of the other group having side cutting edges for cutting one side of a tooth only, there being a gap between the last blade of the first group and the first blade of the second group to permit relative movement between the cutter and a gear blank without relative withdrawal of the cutter from the blank and there being a gap between the last blade of the second group and the first blade of the first group to permit of indexing the blank without relative withdrawal of the cutter from the blank.

3. A face-mill gear cutter having a plurality of blades arranged in two groups part-way around its periphery, the first group comprising a plurality of roughing blades having opposite side cutting edges and a final finishing blade adapted to cut on one side only of a tooth space of a gear blank, and the second group comprising a plurality of roughing blades followed by a finishing blade, all of the blades of the second group being adapted to cut on the opposite side of a tooth space of the blank from that cut by the finishing blade of the first group, the finishing blade of one group having its side-cutting edge offset radially inwardly and the finishing blade of the other group having its side-cutting edge offset radially outwardly from corresponding side-cutting edges of the roughing blades.

4. A face-mill gear cutter having a plurality of cutting blades arranged in two groups which extend part-way around the periphery of the cutter, one group of blades comprising a plurality of roughing blades, which are of progressively increasing height and which have side cutting edges adapted to cut on opposite sides of a tooth slot of a gear blank, and one or more finish-cutting blades which are adapted to finish-cut one side of the tooth slot and which have their side-cutting edges offset radially from corresponding side-cutting edges of the roughing blades, and the other group of blades comprising a plurality of roughing blades, which are all of the same height, and one or more finishing blades, both the roughing and finishing blades of the latter group being adapted to cut on the opposite side of the tooth slot to that which is finish-cut by the finishing blade or blades of the first group of blades, the roughing and finishing blades of the second group having corresponding side-cutting edges offset from one another progressively radially of the axis of the cutter in a direction opposite to the direction of offset of the finishing blades of the first group from the roughing blades of that group there being a gap between the last blade of the second group and the first blade of the first group to permit indexing of the blank without relative withdrawal of the cutter away from the blank and there being a gap between the last blade of the first group and the first blade of the second group to permit relative movement between the cutter and blank between the operation of the two groups of blades without relative withdrawal of the cutter away from the blank.

5. The method of cutting a pair of gears which comprises cutting the larger member of the pair with a face-mill gear cutter, which has a plurality of cutting blades arranged in two groups part-way around its periphery with a gap between the last blade of each group and the first blade of the other, one group having cutting edges which are adapted to cut one side of a tooth space and the other group having cutting edges which are adapted to cut the opposite side of a tooth space, by rotating said cutter in engagement with a gear blank, and holding the blank stationary while each group of blades is taking its cut, and shifting the cutter and blank relative to one another on each revolution of the cutter while the first gap in the cutter is abreast of the blank so that the blades of the two groups will cut relatively from different centers during each revolution of the cutter, and indexing the blank on each revolution of the cutter while the second gap is abreast of the blank, and cutting the other member of the pair by rotating a face-mill gear cutter which has a plurality of cutting blades for cutting opposite sides of a tooth space arranged part-way around its periphery with a gap between the last and first blades, in engagement with a second gear blank on each revolution of the cutter to cut opposite sides of each tooth space of the second blank from the same center while producing a relative rolling movement between the second cutter and blank, and indexing the second blank on each revolution of the second cutter while the gap in the second cutter is abreast of the blank.

6. In a machine for producing gears having a work support and a cutting tool in the form of a face-mill gear cutter whose cutting blades are arranged in two groups part-way around its periphery with a gap between the last blade of each group and the first blade of the other group, means for shifting the cutter and blank relative to one another when the first gap is abreast of the blank so that the two groups of blades cut relatively from different centers as they pass through a tooth space of the blank, and means for indexing the blank without relative separation of cutter and blank when the second gap is abreast of the blank.

7. The method of cutting a gear which comprises employing a face-mill gear cutter of large diameter which has a plurality of cutting blades arranged in two groups part-way around its periphery with one or more blades of one group adapted to finish-cut one side of a tooth space of a gear blank and one or more blades of the other group adapted to finish-cut the opposite side of the tooth space with a gap between the first and second groups of blades and between the last blade of the second group and the first blade of the first group, rotating said cutter in engagement with a gear blank, and holding the blank stationary while both groups of blades are passing through a tooth space of the blank, rotating the blank through a slight angle when the gap between the first and second groups of blades is abreast of the blank, and indexing the blank when the other gap is abreast of the blank.

8. The method of cutting a pair of gears which comprises cutting each member of the pair with a face-mill gear cutter that has a plurality of cutting blades that have opposite side-cutting edges and that are arranged part-way only around the periphery of the cutter with a gap between the last and first blades, and which comprises cutting opposite sides of each tooth space of the larger member of the pair from different centers by rotating a cutter of the type described in engagement with a gear blank and holding the blank stationary on its axis during each revolution of the cutter while the blades of the cutter are in cutting engagement with the blank, and effecting relative displacement of the positions of the cutter and blank on each revolution of the cutter when the cutter has made part of a revolution so that the cutter will cut from different centers on each revolution, and indexing the blank on each revolution of the cutter when the gap in the cutter is abreast of the blank, and cutting opposite sides of the tooth spaces of the smaller member of the pair by rotating a cutter of the type described in engagement with a gear blank while producing a relative rolling movement between the cutter and blank on each revolution of the cutter to generate opposite sides of each tooth space from the same center and indexing the blank on each revolution of the cutter when the gap in the cutter is abreast of the blank.

9. The method of cutting a gear which comprises rotating a cutter that has a plurality of cutting edges arranged part-way only around its periphery with a gap between the last and first edges, in engagement with a gear blank and effecting a relative displacement of the positions of cutter and blank when the cutter has made part of a revolution and indexing the blank when the gap in the cutter is abreast of the blank so that the cutter cuts in a new tooth space of the blank after each revolution.

10. The method of cutting a gear which comprises employing a face-mill gear cutter which has a plurality of rough-cutting blades and a plurality of finish-cutting blades arranged part-way around its periphery with a gap between the last and first blades, adjusting said cutter into engagement with a gear blank so that the cutter will cut to the full depth of the tooth spaces of the blank without relative depthwise feed movement between cutter and blank, rotating said cutter in engagement with the blank, effecting a relative displacement between cutter and blank when the cutter has made part of a revolution and indexing the blank when the gap in the cutter is abreast of the blank.

11. The method of cutting a gear which comprises employing a face-mill gear cutter which has a plurality of cutting blades arranged in two groups that are spaced from one another around the periphery of the cutter, each group comprising a plurality of rough-cutting blades and one or more finish-cutting blades, the finishing blades of one group being adapted to finish-cut one side of a tooth space of a gear blank and the finishing blades of the other group being adapted to finish-cut the opposite side of the tooth space, rotating the cutter in engagement with the blank, and effecting relative movement between the cutter and blank between the operations of the two groups of blades so that the two groups of blades will cut opposite sides of the tooth space from different centers.

12. A face-mill gear cutter for cutting gears by continuous rotation of the cutter and intermittent indexing of the gear blank, said cutter having a plurality of cutting blades arranged in two groups which extend part-way only around the periphery of the cutter, one group of blades comprising a plurality of roughing blades and one or more finishing blades, the roughing blades having side cutting edges for cutting opposite sides of the tooth spaces of the gear blank and the finishing blade or blades having a side cutting edge or edges for cutting one side of the tooth spaces of the blank and being offset radially of the axis of the cutter with reference to the corresponding side cutting edges of the roughing blades, the other group of blades comprising a plurality of roughing blades and one or more finishing blades, both the roughing and finishing blades of the latter group being adapted to cut on the opposite side of the tooth spaces from that which is finish-cut by the finishing blade or blades of the first group, the finishing blades of the second group being offset radially of the axis of the cutter with reference to the corresponding side cutting edges of the roughing blades of that group, the offset being in a direction opposite to the offset of the finishing blades of the first group with reference to the roughing blades of that group, there being a gap between the last blade of the second group and the first blade of the first group to permit indexing of the blank without relative withdrawal of the cutter away from the blank, and there being a gap between the last blade of the first group and the first blade of the second group to permit relative movement between the cutter and blank, between the operation of the two groups of blades, without relative withdrawal of the cutter away from the blank.

13. In a machine for cutting gears, a face-mill cutter having a plurality of blades arranged part-way around its periphery with a gap between the last and first blades, means for rotating the cutter in engagement with the gear blank, means for effecting relative displacement of the position of the cutter center relative to the blank on each revolution of the blank when the cutter has made part of a revolution, and means for indexing the blank on each revolution of the cutter when the gap in the cutter is abreast of the blank.

LEONARD O. CARLSEN.